United States Patent [19]

Yasuda

[11] Patent Number: 4,835,753
[45] Date of Patent: May 30, 1989

[54] INFORMATION PLAYBACK SYSTEM HAVING AN ADDRESS SEARCH OPERATION USING A VARIABLE SPEED PICKUP POSITIONING SYSTEM

[75] Inventor: Shigeru Yasuda, Tokorozawa, Japan

[73] Assignee: Pioneer Electronic Corporation, Tokyo, Japan

[21] Appl. No.: 19,628

[22] Filed: Feb. 27, 1987

[30] Foreign Application Priority Data

Feb. 28, 1986 [JP] Japan ................................ 61-043186

[51] Int. Cl.⁴ .......................................... G11B 27/10
[52] U.S. Cl. .................................... 369/32; 318/599; 369/44
[58] Field of Search ........................... 369/32, 54, 44; 360/74.4; 318/599, 640

[56] References Cited

U.S. PATENT DOCUMENTS

| | | | |
|---|---|---|---|
| 4,228,326 | 10/1980 | Dakin et al. | 369/50 |
| 4,351,044 | 9/1982 | Imanaka et al. | 369/51 |
| 4,506,355 | 3/1985 | Dakin et al. | 369/32 |
| 4,608,676 | 8/1986 | Yoshida et al. | 369/32 |
| 4,630,250 | 12/1986 | Nonomura | 369/44 |
| 4,783,774 | 11/1988 | Enomoto | 318/599 |

*Primary Examiner*—William H. Beha, Jr.
*Attorney, Agent, or Firm*—Fleit, Jacobson, Cohn & Price

[57] ABSTRACT

Information playback system for playing back information recorded on a record disk on which a plurality of recording track portions are juxtaposed in a radial direction, includes a detector for detecting information of a relative position of an information reading point on the radial direction of the record disk. During an address search operation, the information reading point is moved across the recording track portions at a speed calculated on the basis of the relative position of the information reading point.

6 Claims, 4 Drawing Sheets

INFORMATION PLAYBACK SYSTEM HAVING AN ADDRESS SEARCH OPERATION USING A VARIABLE SPEED PICKUP POSITIONING SYSTEM

BACKGROUND OF THE INVENTION

1. Field of the Invention

The present invention relates to an information playback system, and more particularly to an information playback system for playing back information recorded on a recording disk such as a video disk.

2. Description of Background Information

Information recording disks such as video disks are designed such that, in addition to the audio and video information recorded thereon, address information corresponding to the information in each recording track is also recorded. By utilizing this address information, the so-called random access operation, i.e. playback of a desired part of the recording disk, is enabled.

On the other hand, playback systems for playing back information recorded on a recording disk are generally provided with a pickup positioning system by which a position of the pickup relative to the disk in the radial direction of the disk (i.e. a direction normal to the direction of recording tracks) is adjusted. This pickup positioning system generally comprises a tracking servo device, and a slider translating device such as a slider motor by which a slider member carrying a pickup is translated in the radial direction of the recording disk. By the operation of the tracking servo device, for example including a biasing means such as a tracking mirror, the position of the pickup is shifted in the radial direction of the recording disk so that the information reading point of the pickup such as a laser light spot always traces one of the recording tracks accurately.

The address search operation of the playback system is performed as follows. When a desired address is designated, address information read by the pickup and the designated address is compared. Then, the slider translating device is driven until the difference between the designated address and address information read by the pickup is smaller than a predetermined value, so that the information reading point of the pickup is moved at a predetermined speed. On the other hand, in the case of scan mode operation in which the information reading point of the pickup is moved by a fast forward or reverse operation toward a position in which a desired information is recorded, a control operation is performed so that the slider translating device is moved in response to a manual operation of an operator (user) so that the information reading point of the pickup is moved at the predetermined speed.

In the information playback systems operated in this way, however, the address search operation or the fast forward or reverse operation may not be properly performed for the playback of information recorded on a constant linear velocity type record disk which is to be driven so that the linear velocity of the movement of the recording track is constant (referred to as a CLV disk hereinafter), or a constant angular acceleration type record disk which is to be rotated so that the rate of the variation of the angular velocity is constant (referred to as a CAA disk hereinafter).

More specifically, the rate of rotation of the disk varies depending on the information reading point of the pickup in the case of the CLV disks or the CAA disks. Therefore, if the drive speed of the slider motor is to be controlled constant, the slider translation device should be controlled so that the drive operation of the spindle motor for rotating the record disk follows the translation of the information reading point even between positions through which the rate of rotation of the record disk varies greatly, in order that the address information is read accurately.

Therefore, in the case of the information playback systems of conventional type, it is not possible to raise the speed of the movement of the information reading point during the address search operation. This leads to a relatively long access time of the information playback system. Further, there is a problem that the speed of the playback of recorded information during the fast forward or the fast reverse operation differs largely between the innermost part and the outermost part of the recording tracks of the record disk.

OBJECT AND SUMMARY OF THE INVENTION

An object of the present invention is therefore to provide an information playback system in which a stable high speed address search operation and a fast forward (reverse) operation with a constant playback speed are enabled.

According to the present invention, an information playback system is provided with a device for moving the information reading point in a direction substantially normal to recording tracks at a speed corresponding to a relative position of the information reading point on a radial direction of the recording disk.

DETAILED DESCRIPTION OF A PREFERRED EMBODIMENT

Figure 1:
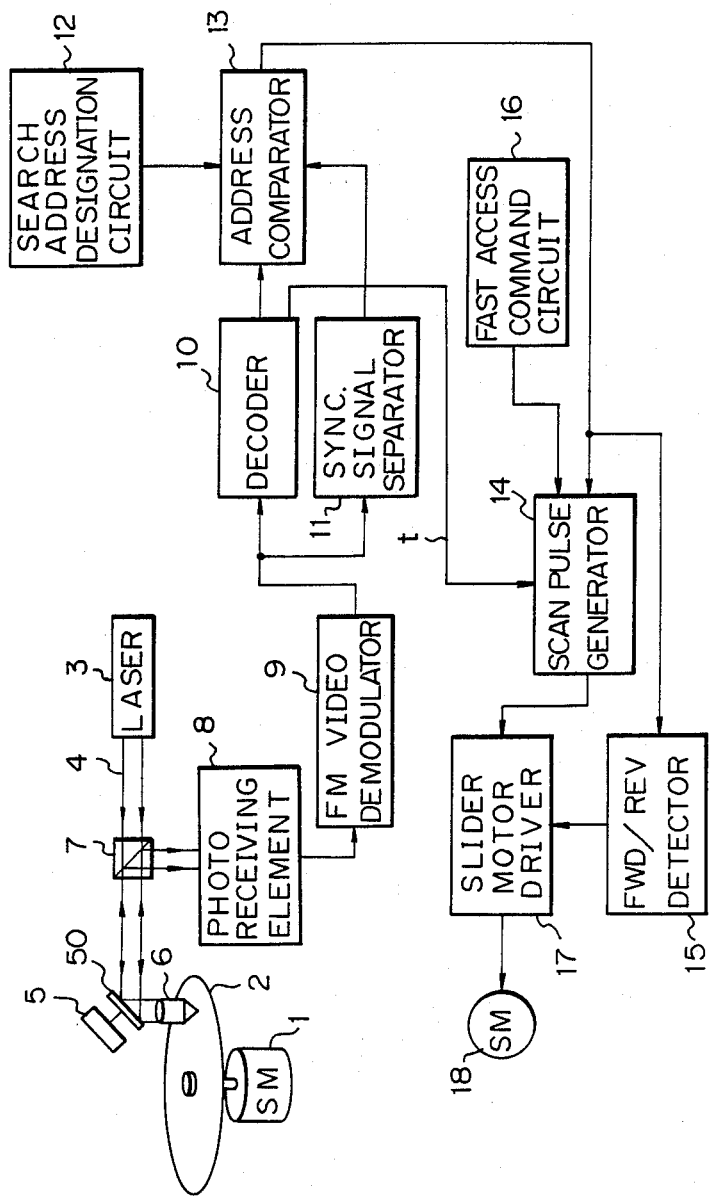
FIG. 1 is a block diagram which schematically shows an embodiment of the information playback system according to the present invention.

An embodiment of the information playback system according to the present invention will be explained with reference to accompanying drawings FIG. 1 shows the embodiment of the information playback system according to the present invention As shown, the system includes a spindle motor 1 for rotating a recording disk 2 at high speed The system is provided with a laser beam source 3 which emits a laser beam 4 for picking up the information recorded on the recording disk 2. The laser beam 4 generated by the laser beam source 3 is directed to a recording surface of the recording disk 2 through a beam splitter 7, a tracking mirror 50, and a converging lens 6. The tracking mirror 50 is supported by a transducer 5 for shifting the angular position of the tracking mirror 50. By the operation of the tracking mirror 50 driven by the transducer 5, the path of the laser beam 4 is moved in the radial direction of the recording disk 2 by a small amount. By this operation, the laser beam 4 can be always positioned on one of the recording tracks on the recording disk 2.

The converging lens 6 is provided so that the laser beam 4 is properly focused on the recording surface of the recording disk 2. By controlling the movement of the converging lens 6 in the direction normal to the recording surface of the recording disk 2, error of convergence because of such a reason as the curving of the disk 2 is prevented. A reflection laser beam which carries the information recorded on the recording disk 2 passes through the converging lens 6 and then directed to the beam splitter 7 after being reflected by the tracking mirror 50 driven by the transducer 5. At the beam splitter 7, the reflection laser beam is reflected again and directed to a photo receiving element 8 which generates an electric signal corresponding to the amount of the incident reflected laser beam. The thus generated electric signal is in turn transmitted to an FM video demodulator 9 in which an FM demodulation takes place.

An FM demodulation output signal output from the FM video demodulator 9 is in the form of video format signal which consists of a plurality of frames. Each of the frames of the FM demodulation signal carries an address information (frame number), time information which indicates a playback time from a predetermined start point to the each frame, and includes synchronizing signals. The FM demodulation signal is then supplied to a decoder 10 and a synchronizing signal separator 11 which separates the synchronizing signals from the FM demodulation signal. A horizontal synchronizing signal separated at the synchronizing signal separator 11 is supplied to a spindle servo device (not shown) by which the rate of rotation of the spindle motor 1 is controlled so that the horizontal synchronizing signal coincides in phase with a reference horizontal synchronizing signal. In accordance with the FM demodulation signal from the FM demodulator 9, the decoder 10 produces present address data which indicates a present frame number i.e., present address, and a 24 bit time code indicating a playback time from the predetermined start point to the present frame. The present address data, together with a desired search address data which is input by a search address designation device 12, is supplied to an address comparator 13 which also receives a vertical synchronizing signal from the synchronizing signal separator 11. In accordance with the vertical synchronizing signal, the address comparator 13 compares the present address data with the desired address data every one TV field or every one TV frame, and generates output data indicative of the difference of address. The output data includes a term $|X|$ representing the absolute value of the address difference, and a positive or negative sign. This output data is supplied to a scan pulse generator 14 and a forward/reverse detector 15. The scan pulse generator 14 receives the time code from the decoder 10 as a position detection signal indicating a position of the information reading point in a radial direction of the recording disk, and a fast access (fast forward or reverse) command signal supplied from a fast access command generating circuit 16.

The scan pulse generator 14, which is suitably made up of a microcomputer, produces drive pulses, which are supplied to a slider motor driver 17 for producing a drive signal of a slider motor 18. When the absolute value $|X|$ is greater than a predetermined reference, or when the fast access command is supplied, the scan pulse generator 14 controls the pulse width f(x) of the drive pulses. On the other hand, the forward/reverse detector 15 is operative to change the polarity of an output signal of the slider motor driver 17 according to the sign of the address difference, so that the slider motor 18 is driven in a direction in which the absolute value $|X|$ of the address difference is minimized. By the rotation of this slider motor 18, a slider member (not shown) carrying the pickup device is moved to change the relative position between the information reading point and the recording disk in the radial direction of the recording disk, thereby decreasing the absolute value $|X|$.

Figure 2:
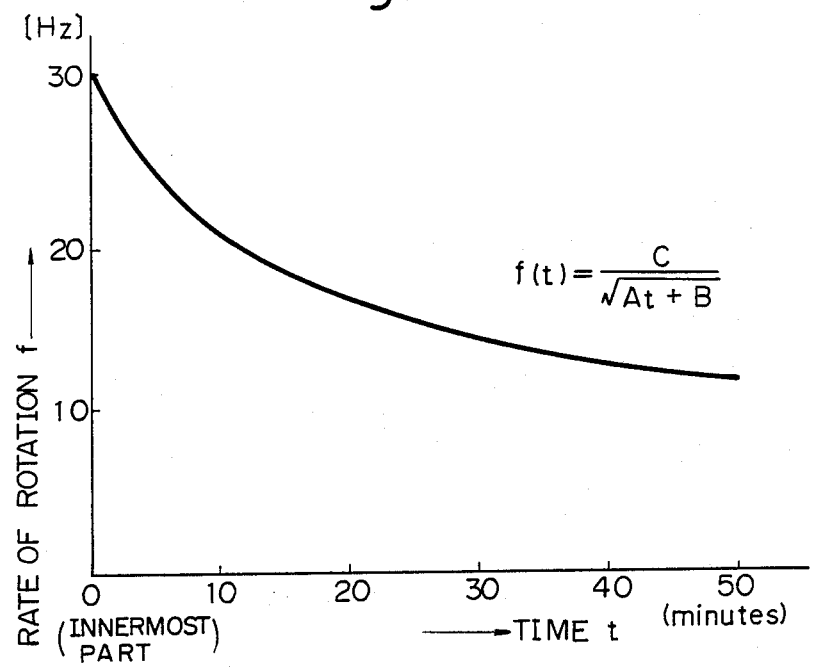
FIG. 2 is a graph showing a relation between the relative speed of the information reading point on the recording disk and the rate of rotation of the recording disk.
Figure 4:
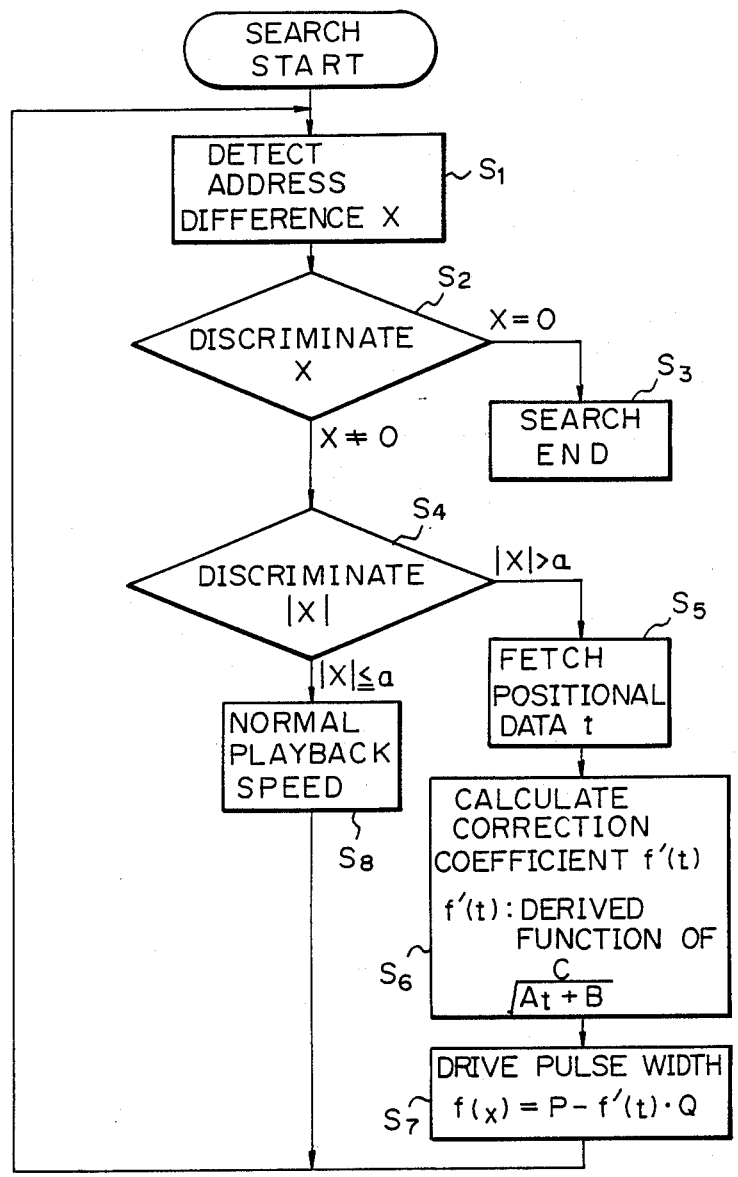
FIG. 4 is a flowchart showing the operation of the scan pulse generator 14 in the information playback system of FIG. 1.

The scan pulse generator 14 is operated by a program based on the flowchart shown in FIG. 4, to provide the drive pulses whose pulse width is determined according to a characteristic curve shown in FIG. 2 when the address difference $|X|$ is greater than a predetermined value a.

As shown in FIG. 4, the microcomputer forming the scan pulse generator 14 executes the follwing process. At first, the address difference is detected from the output signal of the address comparator 13 at the step $S_1$. Then, whether or not the address difference X is equal to 0 is detected at the step $S_2$. If the address difference X is not equal to 0, the program proceeds to a step $S_4$. If, on the other hand, the address difference X is equal to 0 at the step $S_2$, the address search will be stopped at a step $S_3$. At the step $S_4$, the absolute value $|X|$ of the address difference X is compared with the predetermined value a. If the absolue value $|X|$ is equal to or smaller than the predetermined value a ($|X| \leq a$), a drive pulse signal for a normal playback speed is generated at the step $S_8$. After the execution of the operation of the step $S_8$, the program returns to the step $S_1$. If, on the other hand, the absolute value $|X|$ is greater than the predetermined value a ($|X| > a$), the time code t (positional data) supplied as a position detection signal is fetched at a step $S_5$. Then a correction coefficient f'(t) is calculated at a step $S_6$. The correction coefficient f'(t) is a derived function of the following formular (1) which represents the curve shown in FIG. 2.

$$f(t) = \frac{C}{\sqrt{At + B}} \quad (1)$$

in which A, B, and C are constant, f is the rate of rotation of the recording disk at the position t.

Subsequently, the pulse width f(x) of the drive pulse is calculated by the following formular (2) at a step $S_7$, and in turn the drive pulse is output.

$$f(x) = P - f'(t) Q \quad (2)$$

in which P and Q are constants. Then the operations from the step $S_1$ will be repeated.

Figure 3:
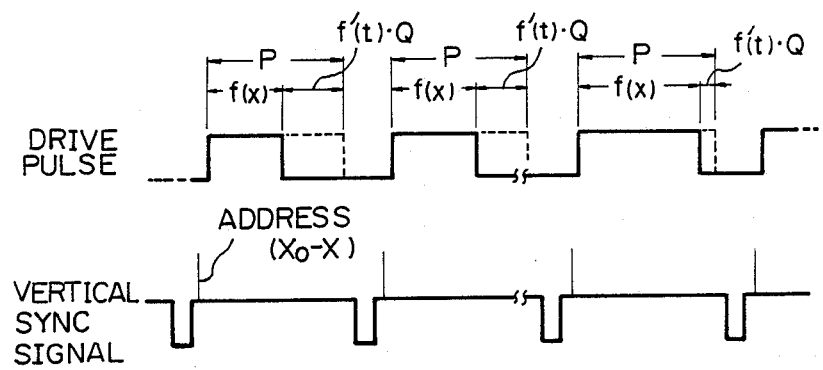
FIG. 3 is a waveform diagram showing waveforms of signals generated at circuit points of the information playback system shown in FIG. 1.

By the operations explained above, the pulse width f(x) of the drive pulse becomes smallest when the information reading point is located at the innermost track of the recording disk. As the information reading point moves outward, the pulse width f(x) of the drive pulse increases gradually. FIG. 3 shows the relation between the vertical synchronizing signal and the drive pulse signal. As shown, the duty ratio of the drive pulse signal is varied as a result of the change in the pulse width f(x), while the repetition frequency thereof is maintained at the frequency of the vertical synchronizing signal. Further, during the presence of each pulse of the drive pulse signal, the slider motor 18 is supplied with the drive current so that a drive force is applied to the slider member. On the other hand, when the pulse of the drive pulse signal is not present, a braking force is applied to the slider member because of mechanical friction. In short, the driving force for moving the slider member is determined correspondingly to the duty ratio of the drive pulse signal. Further, the amplitude of this drive pulse signal is determined to be a value which provides a maximum drive current to the slider motor 18, so that the maximum acceleration of the slider motor 18 is attained.

Therefore, the speed of the movement of the slider member is smallest when the information reading point is located at the innermost track of the recording disk 2, and gradually increases as the movement of the information reading point toward the outermost recording track.

In the embodiment described above, the pulse width of the drive pulse signal is continuously varied in accordance with the operation of the formula (2). However, according to the present invention, the manner of variation of the pulse width of the drive pulse signal is not limited to this example. For instance, the pulse width of the drive pulse signal may be varied stepwise at least between two different values.

Further, in the above described embodiment, the drive pulse signal is generated in synchronization with the vertical synchronizing signal. However, the frequency of the generation of each pulse of the drive pulse signal may not be equal to the frequency of the vertical synchronizing signal so far as the duty ratio of the drive pulse signal is varied by the pulse width f(x).

Figure 5:
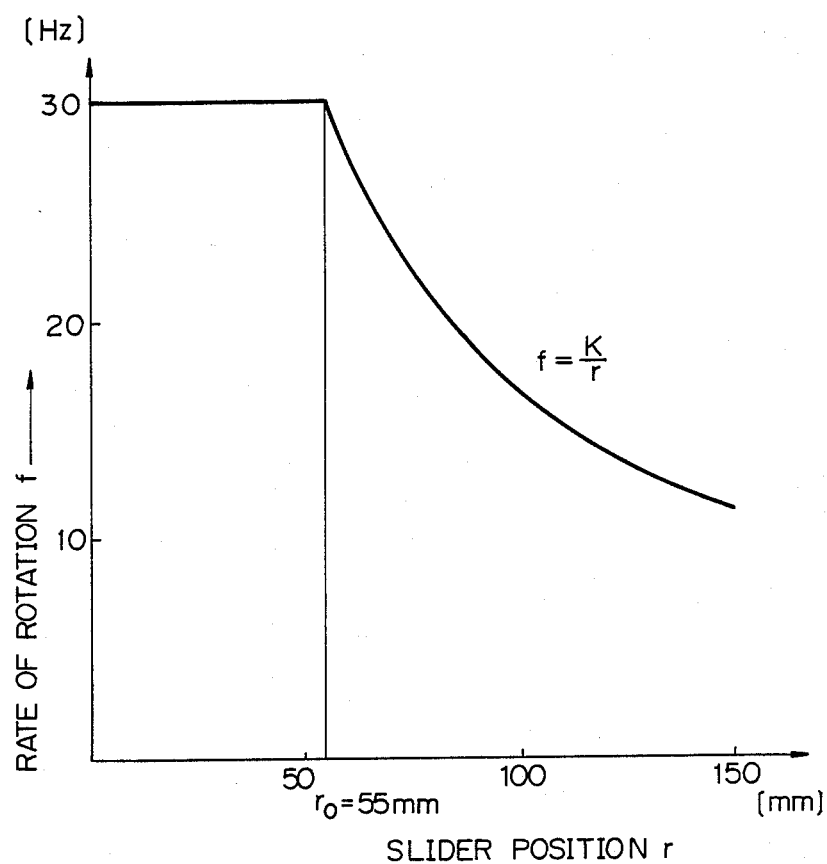
FIG. 5 is a graph showing a relation between the position of the slider member and the rate of rotation of the disk.

In addition, in the above described embodiment, the decoder 10 is utilized as position detection means. However, it is also possible to employ such an arrangement using a potentiometer arranged to generate an output signal whose level represents the slider position. In this case, the pulse width of the drive pulse signal is determined by the rate of rotation f of the recording disk 2 which is derived by an equation of $f=k/r$, and typically illustrated in FIG. 5. Moreover, the position of the slider member can be determined by such an arrangement using a disk fixed on a shaft of the slider motor, with magnetized parts or slits in its periphery. By using a Hall device or a photo sensor, the rotation of such disk is detected and a pulse train is generated correspondingly to the rotation of the slider motor. In this case, data corresponding to the slider position is obtained by counting each pulse of this pulse train signal.

Above, the embodiment of the present invention has been described in which the slider member is forcibly advanced. However, it should be noted that the present invention is applicable to such an arrangement in which the information reading point of the pickup is moved by track jump operation by means of the operation of the tracking mirror supported by the tracking transducer.

It will be appreciated from the foregoing, according to the present invention the information playback system is provided with means for moving the information reading point in a direction substantially normal to the recording tracks, at a speed corresponding to a relative position of the information reading point in a radial direction of the recording disk. Therefore, the speed of the movement of the information reading point in the direction substantially normal to the recording tracks is decreased in the inner part of the recording tracks in which the rate of rotation of the disk must be accelerated or decelerated rapidly in the case of CLV disks, for example. Conversely, in the peripheral part of the recording tracks, the speed of the movement of the information reading point is increased. Thus, the address search operation is performed in a very rapid and stable manner. Further, the amount of information in the recording tracks across which the information reading point is moved per unit time is equalized both in the inner part and in the peripheral part of the recording disk. Therefore, fast access (fast forward and reverse) operation is performed at a constant speed with regard to the amount of the recorded information.

What is claimed is:

1. Information playback system for playing back information recorded on a record disk on which a plurality of recording track portions are juxtaposed in a radial direction thereof, comprising:
    means for rotating said record disk;
    read means for reading said information recorded on said record disk at an information reading point in said radial direction of said record disk and producing a read signal;
    signal processing means for processing said read signal from said read means, and producing an output signal;
    positional information detection means for detecting from said output signal of said signal processing means, information representing a relative position of said information reading point in said radial direction of said record disk and generating a positional information signal;
    drive means for moving said information reading point of said read means along said radial direction of said record disk; and
    control means connected to said drive means and receiving said positional information signal for controlling said drive means so that said information reading point is moved at a speed determined according to a relative position of said information reading point indicated by said positional information signal.

2. An information playback system as set forth in claim 1, wherein said control means includes means for calculating said speed of movement of the information reading point as a function of said relative position of said information reading point.

3. An information playback system as set forth in claim 1, wherein said information recorded on said recording disk is an FM modulation signal of at least a video signal and a coded data signal carrying address data and time code indicative of a playback time from a start point of said record disk, and wherein signal processing means includes an FM demodulator for demodulating said read signal generated by said read means to provide said video signal and said coded data signal, and said positional information detection means includes a decoder for decoding said coded data signal, to provide said address data and time code.

4. An information playback system as set forth in claim 3, wherein said control means includes calculating means for calculating said speed of movement of the information reading point as a function of said time code indicative of the relative position of said information reading point, and means for generating a control pulse train having a plurality of pulses whose width is controlled by said speed of movement of the information reading point calculated by said calculating means.

5. An information playback system as set forth in claim 6, further comprising target address setting means for setting a target address, and address difference detection means for detecting an address difference between said target address and said address data decoded by said decoder, and wherein said control means control said pulse width of said control pulse train in accordance with said speed of movement of the information reading point calculated by said calculating means only when said address difference is larger than a predetermined value.

6. Information playback system for playing back information recorded on a record disk on which a plurality of recording track portions are juxtaposed in a radial direction thereof comprising:

means for rotating said record disk;

read means for reading said information recorded on said record disk at an information reading point in said radial direction of said record disk and producing a read signal;

signal processing means for processing said read signal from said read means and producing an output signal;

positional information detection means for detecting from said output signal of said signal processing means information representing a relative position of said information reading point in said radial direction of said record disk and generating a positional information signal;

drive means for moving said information reading point of said read means along said radial direction of said record disk; and control means connected to said drive means and receiving said positional information signal for controlling said drive means so that said information reading point is moved at a speed determined according to a relative position of said information reading point indicated by said positional information signal;

said information recorded on said recording disk being an FM modulation signal of at least a video signal and a coded data signal carrying address data and time code indicative of a playback time from a start point of said record disk, said signal processing means including an FM demodulator for demodulating said read signal generated by said read means to provide said video signal and said coded data signal;

said positional information detection means including a decoder for decoding said coded data signal to provide said address data and time code; and wherein said control means includes calculating means for calculating said speed of movement of the information reading point as a function of said time code indicative of the relative position of said information reading point, and means for generating a control pulse train having a plurality of pulses whose width is controlled by said speed of movement of the information reading point calculated by said calculating means.

* * * * *